United States Patent [19]

Seki

[11] 4,420,071
[45] Dec. 13, 1983

[54] SAFETY DEVICE FOR MACHINE HAVING FORCEFUL RECIPROCATION

[75] Inventor: Fumio Seki, Toyama, Japan

[73] Assignee: Yoshida Kogyo K.K., Tokyo, Japan

[21] Appl. No.: 303,929

[22] Filed: Sep. 21, 1981

[30] Foreign Application Priority Data

Sep. 19, 1980 [JP] Japan .......................... 55-133440[U]

[51] Int. Cl.³ .............................................. F16P 3/12
[52] U.S. Cl. .................................................. 192/134
[58] Field of Search ............... 192/130, 133, 134, 135; 100/53

[56] References Cited

U.S. PATENT DOCUMENTS

| | | | |
|---|---|---|---|
| 1,084,897 | 1/1914 | Parkinson | 192/134 |
| 1,282,452 | 10/1918 | Mountford | 192/134 |
| 1,370,369 | 3/1921 | Scofield | 192/134 |
| 1,418,525 | 6/1922 | Brower | 192/134 |
| 1,500,337 | 7/1924 | Roth et al. | 192/134 |
| 3,292,837 | 12/1966 | Heil et al. | 227/18 |

FOREIGN PATENT DOCUMENTS 778252 12/1934 France ............................... 192/134

*Primary Examiner*—Allan D. Herrmann
*Attorney, Agent, or Firm*—Bucknam and Archer

[57] ABSTRACT

A safety device comprising an obstacle-detecting sensor and a plate cam pivotally coaxially mounted on a forceful reciprocation machine which has a stationary block and a reciprocating member adapted for vertical reciprocation thereto, the plate cam and the sensor being turned coextensively over a first angular range until the sensor reaches the stationary block and thereafter the plate cam alone continuing to be turned over a second angular range, whereupon a deflection formed on the periphery of the plate cam is brought into engagement with a switch roller thereby activating the reciprocating member.

12 Claims, 4 Drawing Figures

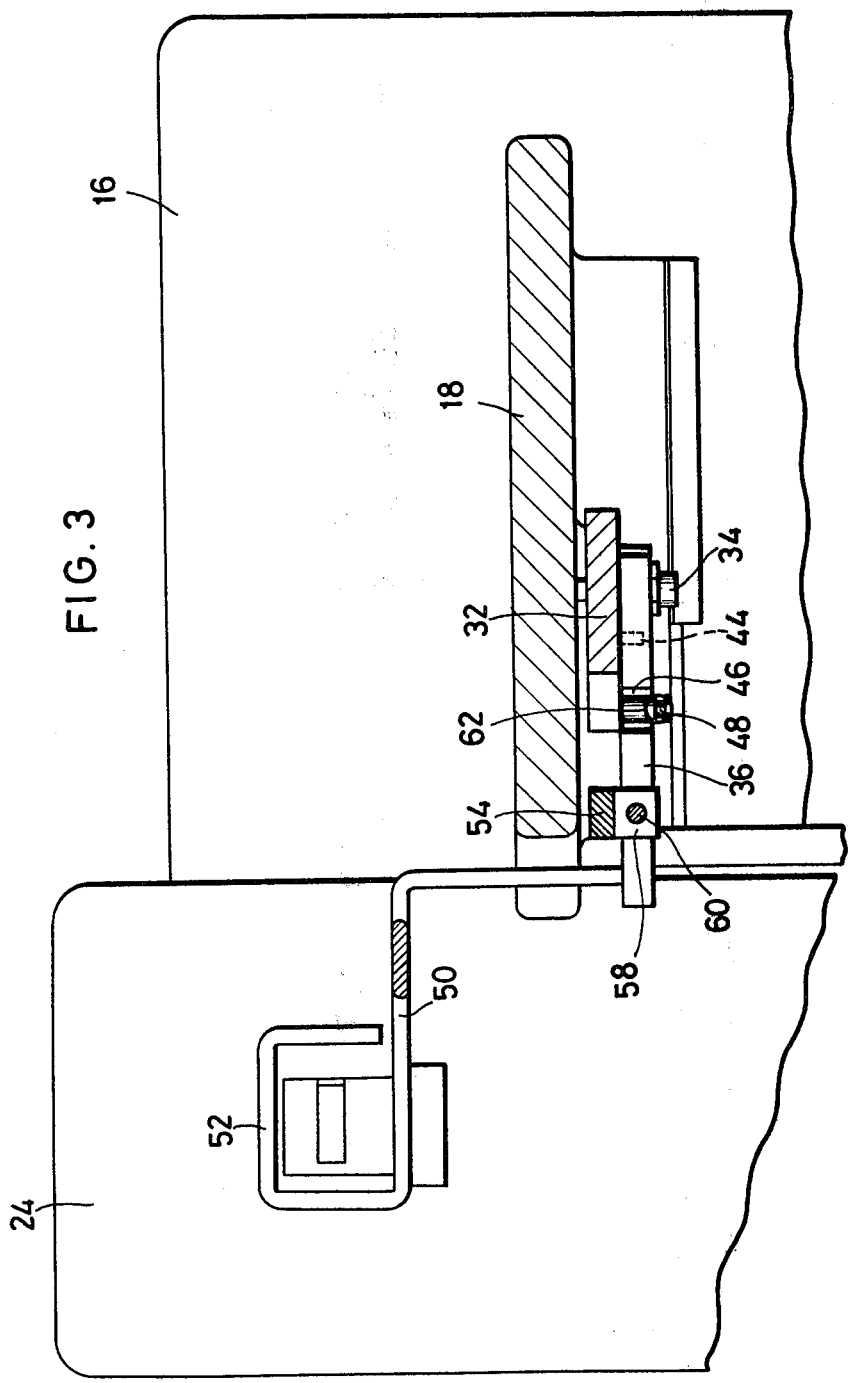

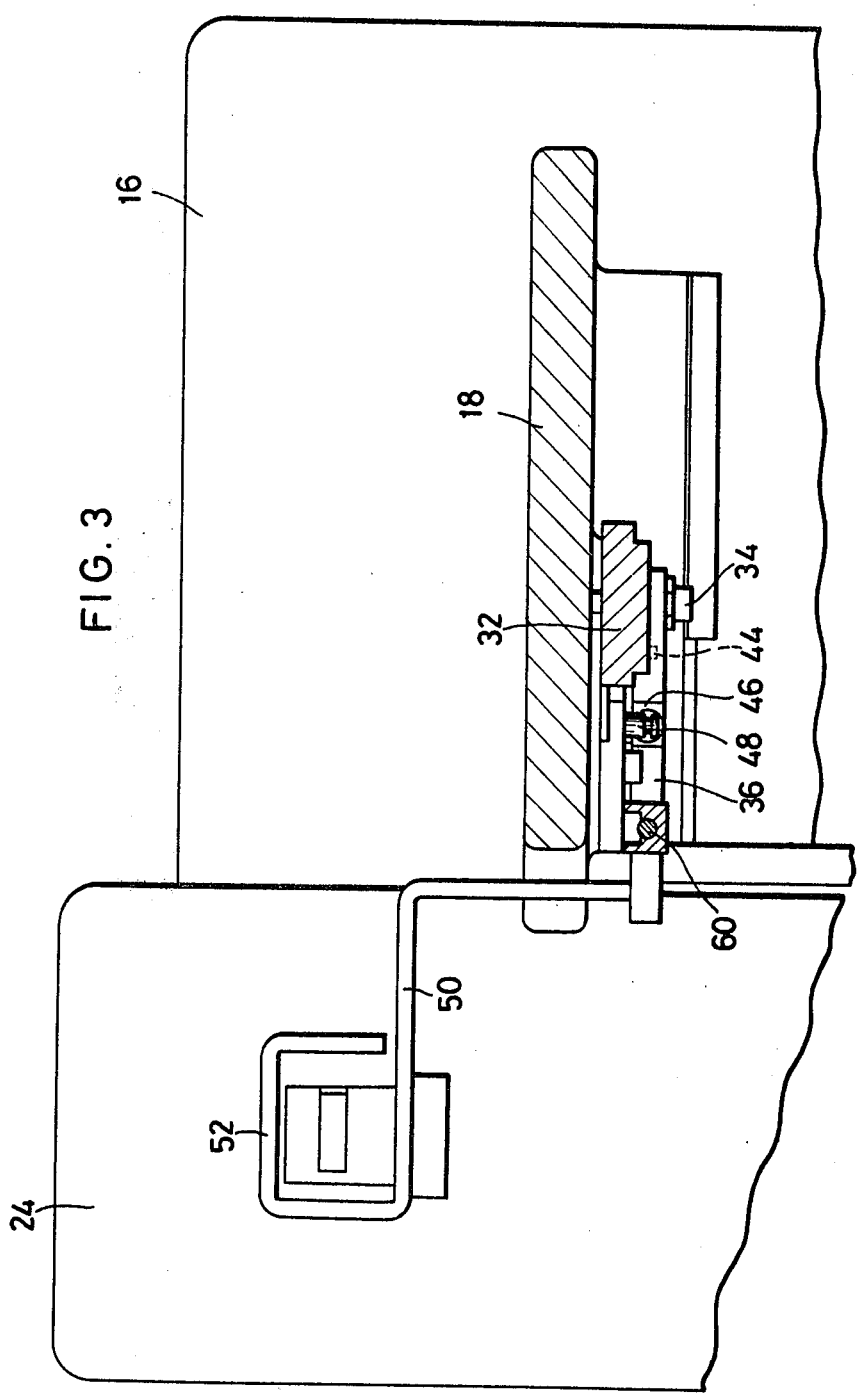

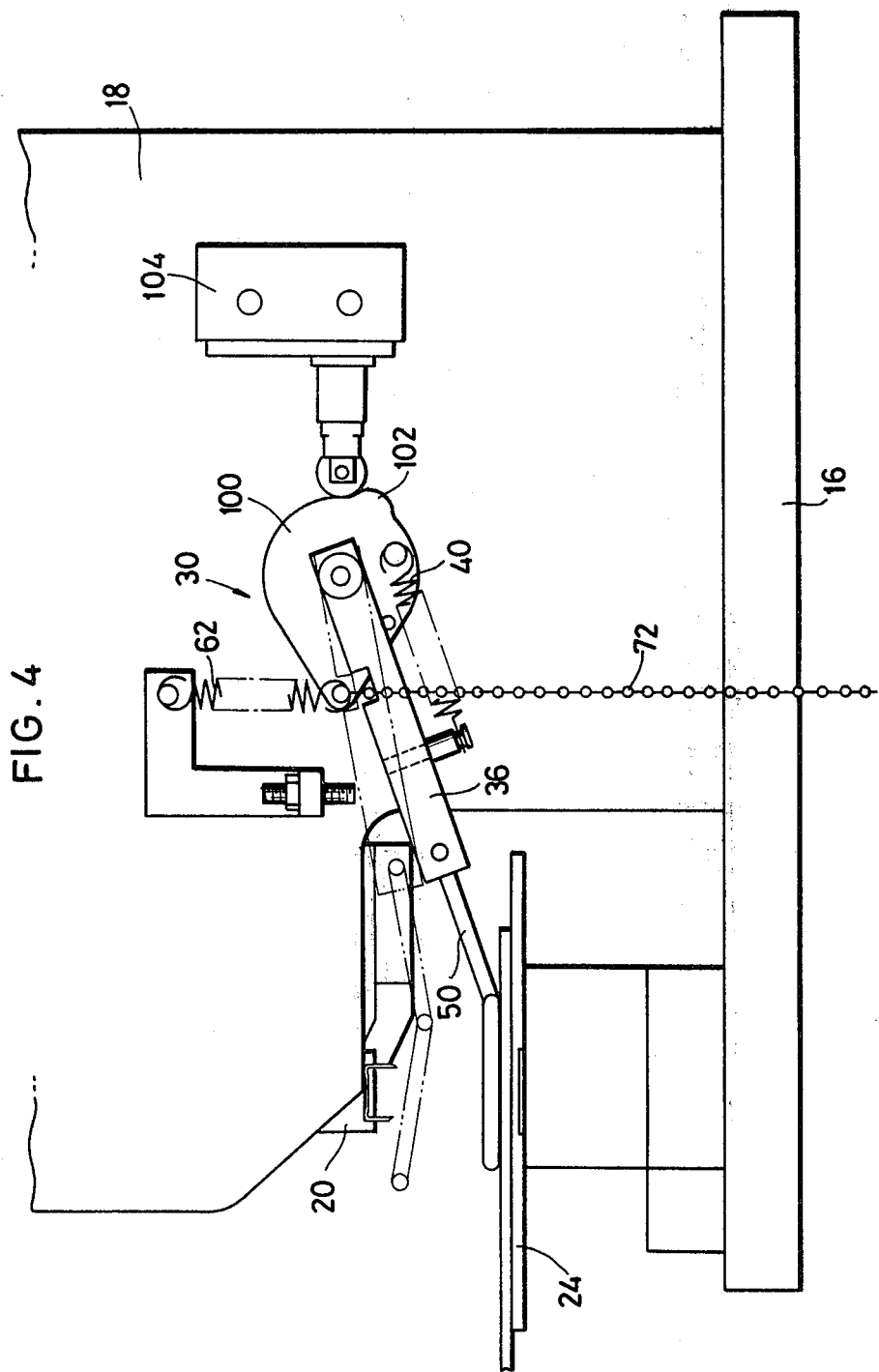

SAFETY DEVICE FOR MACHINE HAVING FORCEFUL RECIPROCATION

BACKGROUND OF THE INVENTION

1. Field of the Invention

This invention relates to a safety device used for an apparatus of the type having a frame, a stationary block fixed to the frame and a reciprocating member mounted on the frame, disposed above and in vertically opposed relation to the stationary block and adapted for forceful reciprocation thereto, such as presses, riveters, stakers, staplers and drills, which type of apparatus is hereinafter referred to as a "forceful reciprocation machine" for convenience's sake.

2. Prior Art

An example of safety devices of the type described is disclosed in U.S. Pat. No. 3,292,837 patented on Dec. 20, 1966. This safety device is shown as incorporated in a stapling machine for application of hook and eye fastener parts to fabric of a garment. The safety device broadly comprises a yoke or operating lever pivotally mounted on a frame of the machine, a safety guard or sensor pivotally mounted coaxially with the operating lever, and a switch provided above the common axis thereof and having a protruding plunger engageable with the rear end of the operating lever, and is systematically constructed that when the sensor has been fully lowered into engagement with the garment fabric and the operating lever has further turned over an angle of overtravel, the rear end of the operating lever is brought into impinging contact with the switch plunger, thereby activating a ram having a staple holder at its lower end.

Although, in general, having performed satisfactorily, this safety device has not been found to be entirely suitable in applications wherein the location for installment of the safety device is limited to a small space by a crowd of various components mounted on the complex forceful reciprocation machine and/or wherein extremely long serviceability of the safety device is a major requirement. Specifically speaking, the prior art safety device has encountered a drawback that, since the location to install the switch of the safety device is limited to a small area overlying the common axis of the operating lever and the sensor, the prior art safety device as a whole, in turn, sometimes finds a difficulty in being installed in such a complex machine having a large number of various components gathered closely together adjacent to the reciprocating staple holder. Further disadvantageously, the operating lever, at its rear end, is held into repeated impinging contact with the switch plunger, so that both operating lever and switch plunger are liable to be broken-down or made out of service in a relatively short period of time.

SUMMARY OF THE INVENTION

It is, therefore, an object of this invention to provide an improved safety device for a forceful reciprocation machine which can be installed in a remaining small space of any contour defined by a crowd of components mounted on the forceful reciprocation machine.

It is another object of this invention to provide an improved safety device for a forceful reciprocation machine which is so constructed to be highly resistant to breakdown and hence will keep in proper and sound order for a prolonged period of time.

It is still another object of this invention to provide an improved safety device for a forceful reciprocation machine constructed such that a finger of an operator, even if accidentally inserted below a sensor, would be patted thereby more lightly or with a less force than he stepped on a foot pedal for activation of the forceful reciprocation machine.

It is yet another object of this invention to provide an improved safety device for a forceful reciprocation machine so constructed as to ensure that a finger of an operator or any extraneous thing, even if accidentally inserted below a reciprocating member of the machine, is completely prevented from being hurt or damaged by the downward stroke thereof.

It is yet another object of this invention to provide an improved safety device for a forceful reciprocation machine constructed such that an operator can feel imminence of a downward stroke of a reciprocating member on his foot when having stepped on a foot pedal at half stroke, so that, by keeping the foot pedal in pause at this half stroke, the operator can successfully concentrate his attention to the imminent operation and properly adjust the position of the garment fabric on the working table for the pause or before resuming to step on the foot pedal to complete the downward stroke of the reciprocating member.

According to a preferred embodiment of the present invention the foregoing and other objects are attained by providing within a forceful reciprocation machine having a frame, a stationary block fixed to the frame and a reciprocating member mounted on the frame, disposed above and in vertically opposed relation to the stationary block, and adapted for vertical reciprocation thereto, a safety device comprising in combination: (a) a sensor pivotally mounted at its one end on the frame and having the other end thereof disposed between the stationary block and the reciprocating member for detecting an obstacle on the stationary block; (b) a plate cam pivotally mounted coaxially with the sensor and having a deflection formed on the peripheral surface thereof; (c) first means for confining with the stationary block the angular movement of the sensor to a first angular range; (b) second means for confining the relative angular movement of the sensor and the plate cam to a second angular range; (e) a first spring for urging the sensor in a first pivotal direction relative to the plate cam; (f) a second spring for urging the plate cam in a second pivotal direction; (g) a switch provided beside the plate cam and having a roller adapted for resilient and rolling engagement with the peripheral surface of the plate cam; (h) activating means for turning the plate cam in the first pivotal direction against the biases of the first and second springs, so that the plate cam and the sensor are turned coextensively over the first angular range against the bias of the second spring until the sensor reaches the stationary block and thereafter the plate cam alone continues to be turned over the second angular range against the combined biases to the first spring and the second spring, whereupon the deflection is brought into engagement with the roller thereby activating the reciprocating member.

Other objects and a fuller understanding of the invention may be had by referring to the following description and claims taken in conjunction with the accompanying drawings in which:

BRIEF DESCRIPTION OF THE DRAWINGS

FIG. 3 is a horizontal cross-sectional view taken along the line III—III of FIG. 2; and FIG. 4 is a side elevational view of a machine with safety device similar to FIG. 2 but shows a modified embodiment of the present invention.

DETAILED DESCRIPTION OF THE PREFERRED EMBODIMENTS

Figure 1:
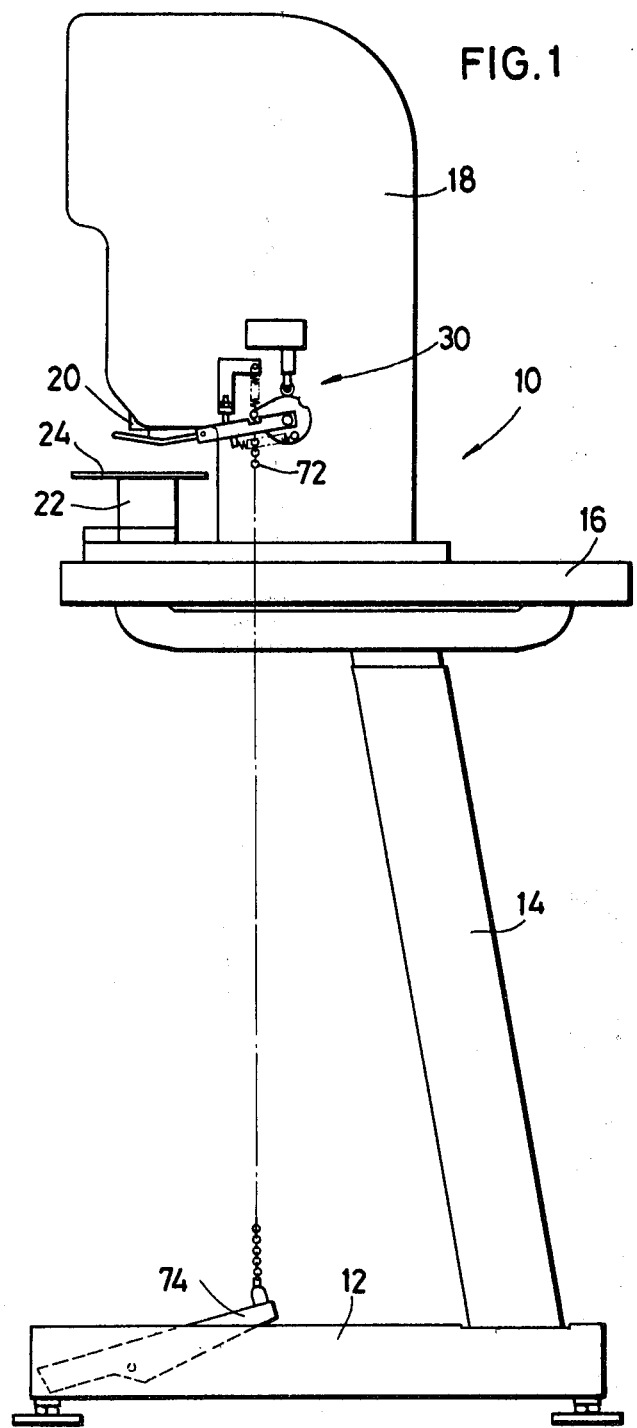
FIG. 1 is a side elevation of a stapling machine in which a new and improved safety device constructed according to a preferred embodiment of the present invention is shown incorporated.

With reference to drawings, the present invention is illustrated as being incorporated in a stapling machine used for application of hook and eye fastener parts to fabric of a garment, although the invention is versatile to forceful reciprocation machines of various types having a stationary block and a reciprocating member forcefully reciprocating thereto, such as for example, presses, riveters, stakers, staplers and drills.

Reference numeral 10 broadly denotes a frame of the stapling machine which comprises a base 12, a standard 14 fixed substantially upright thereto, a bed 16 mounted horizontally on the standard 14 and a transversely extending upright head plate 18 mounted on the bed 16. A ram (not shown) is mounted on the head plate 18 and adapted for vertical reciprocation by an air cylinder (not shown either). The ram is provided at its lower end with a fastener holder 20 designed in the shown embodiment for holding a hook part of a hook and eye fastener. Mounted on the horizontal bed 16 in vertically opposed relation to the fastener holder 20 is a die holder 22 within which a die (not shown) is embedded in vertical registration with the fastener holder 20. A working table 24 is horizontally mounted on the die holder 22 for convenience in manipulation by an operator of the garment fabric.

Figure 2:
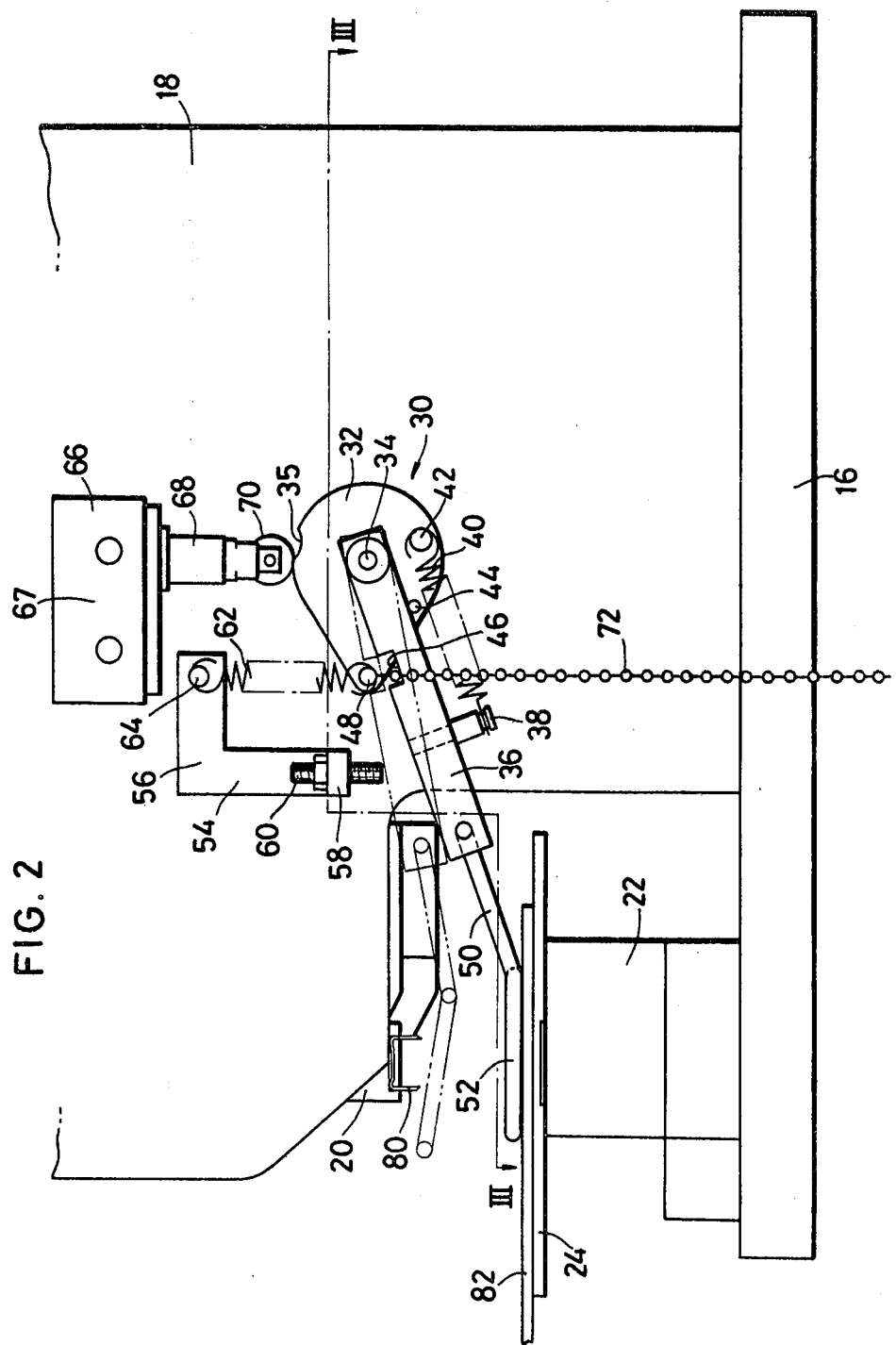
FIG. 2 is an enlarged side elevational view of the safety device shown in FIG. 1 and several associated parts of the stapling machine.

Reference numeral 30 broadly denotes a safety device mounted on one side of the head 18 and disposed beside the reciprocating member and fastener holder 20, the detailed construction of which device is shown in FIGS. 2 and 3.

A plate cam 32 assumes a substantially tear-drop shaped configuration, as projected upon the side surface of the head plate 18, and is pivotally mounted on the head plate 18 by a shaft 34 which is disposed adjacent to and rightward (as viewed in FIG. 2) of the fastener holder 20. The plate cam 32 is provided in the peripheral surface thereof with an arcuate concave 35 of which function is described in detail hereinafter.

An elongated rectangular sensor arm 36 is mounted at its one end pivotally and coaxially on the common shaft 34. A pin 38 is provided on the lower side of and intermediately of the rectangular sensor arm 36. A first tension spring 40 is connected between the pin 38 of the sensor arm 36 and a protuberant lug 42 provided on the lower part of the side surface of the plate cam 32, so that the sensor arm 36 is urged to angularly move counterclockwise (as viewed in FIG. 2) relative to the plate cam 32 into abutting engagement with a protuberant peg 44 provided on the side surface of the plate cam and disposed slightly above the protuberant lug 42. The sensor arm 36 is provided intermediately and in the upper edge thereof with a rectangular indentation 46 which is disposed in confronting relation to a stud 48 provided on the apex or the right end (as viewed in FIG. 2) of the tear-drop shaped plate cam 32. Therefore, the relative angular movement of the sensor arm 36 to the plate cam 32 is confined to a second angular range by the stud 48 and the peg 44. Connected to the distal end of the sensor arm 36 is a sensor rod 50 terminating in a rectangular loop 52 which is arranged in surrounding relation to the vertical path along which the fastener holder 20 reciprocates.

A bracket 54 has one of the legs thereof or a support leg 56 fixed to the head plate 18 upwardly of the sensor arm 36 and the other leg or the projecting leg 58 disposed over the sensor arm 36. The projecting leg 58 is provided with a through threaded hole (not shown) through which an adjustable screw 60 is screwed for abutting engagement with the sensor arm 36 so as to restrict clockwise angular movement of the sensor arm 36 and hence the plate cam 32. Therefore, the angular movement of the sensor arm 36 is confined to a first angular range by the working table 24 and the adjustable screw 60. A second tension spring 62 is connected between the stud 48 and a post 64 fixed to the support leg 56 of the bracket 54, thereby urging the plate cam 32 and hence sensor arm 36 as well in clockwise direction as viewed in FIG. 2.

Mounted on the head plate 18 upwardly of the plate cam 32 is a limit switch 66 which has a switch body 67, an actuating plunger 68 projected downwardly from the bottom thereof and resiliently supported thereby and a follower roller 70 rotatably mounted on the tip of the actuating plunger 68, so that the follower roller 70 is held in resilient and rolling engagement with the peripheral surface of the plate cam 32. The relative arrangement of the plate cam 32 and the limit switch 66 is such that only when the plate cam 32 is turned fully over the first and second angular ranges, the follower roller 70 is rolled into fitting engagement with the arcuate concave 35, whereupon the limit switch 66 activates the control circuit for operation of the air cylinder.

Hanging from the stud 48 of the plate cam 32 is a chain 72 whose distal end is attached to the toe of a foot pedal 74 which is mounted on the base 12 for pivotal movement on an intermediate axis, as shown in FIG. 1

The safety device 30 of the foregoing construction operates as follows. In preparation for operating the stapling machine, a fastener 80 (a hook part of a hook and eye fastener as shown in this embodiment) is retained on the fastener holder 20 and fabric of a garment 82 is placed flat on the working table 24.

A depression of the foot pedal 74, transmitted via the chain 72 to the plate cam 32, causes the plate cam 32 and the sensor arm 36 to turn counterclockwise (as viewed in FIG. 2) and coextensively over the first angular range against the bias of the second tension spring 62, thereby bringing the rectangular loop 52 of the sensor rod 50 into abutting and blocked engagement with the garment fabric 82 on the working table 24.

Upon continued depression of the foot pedal 74, the plate cam 32 alone still keeps on turning counterclockwise over the second angular range against the combined biases of both first and second tension springs 62, 40 until the stud 48 of the plate cam 32 comes into abutting engagement with and is blocked by the indentation 46 of the sensor arm 36. At this very moment, the follower roller 70 of the switch 66 rolls into fitting engagement with the arcuate concave 35 of the plate cam 32, so that the limit switch 66 activates the control circuit (not shown) for actuation of the air cylinder, whereupon a downward stroke of the ram and hence the fastener holder 20 is provided.

FIG. 4 illustrates another embodiment of the present invention which is substantially identical to the preceding embodiment with the exception that a plate cam 100 has a convex 102 instead of a concave 35 provided on the peripheral surface thereof and disposed diametrically opposite to the apex thereof, and a switch 104 is accordingly placed on the right side (as viewed in FIG. 4) of the plate cam 100. This embodiment is intended to show substantially of the convex for the concave 35 of the preceding embodiment and adaptability of the switch 66, 104 to various locations surrounding the plate cam 32, 100.

It is to be recognized that immediately after the rectangular loop 52 of the sensor rod 50 reaches the garment fabric 82 on the working table 24, an additional bias of the first tension spring 40 begins to be exerted to resist the depression of the foot pedal 74, so that the operator can feel an imminence of a downward stroke of the ram on his foot when having stepped on the foot pedal 74 at half stroke. Therefore, by keeping the foot pedal 74 in pause at this half stroke, the operator can successfully concentrate his attention to the imminent operation and properly adjust the position of the garment fabric 82 on the working table 24 for the pause or before resuming to step on the foot pedal to complete the downward stroke of the ram.

Further advantageously, even if the foot pedal 74 is depressed in full stroke while a finger of the operator or any extraneous thing accidentally lies between the garment fabric 82 and the loop 52 of the sensor rod 50, the stapling machine nevertheless will not start to work with assurance, since, as long as the sensor rod 36 is obstructed by the obstacle, a further turn of the plate cam 32 would cause the stud 48 to come into abutting engagement with and to be blocked by the indentation 46 of the sensor arm 36 before the follower roller 70 fills into fitting engagement with the concave 35 of the peripheral surface of the plate cam 32, with the result that the finger of the operator or the extraneous thing is completely prevented from being hurt or damaged by the downward stroke of the fastener holder 20.

Still further advantageously, the impact on an operator's finger exerted by the sensor rod 50 is reduced to minimum since being absorbed by the first tension spring 40, so that this safety device will cause no such fear on even novices or female workers as a prior art safety device was liable to cause upon them.

Yet further advantageously, the switch roll 70 is held in resilient and rolling engagement with the peripheral surface of the plate cam 32 so as to be brought into and out of engagement with the deflection 35 in response to the angular movement of the plate cam 32, so that the switch roll 70 and the deflection 35 is subjected to by far less impact when mutually engaged than a switch plunger and an operating lever of the prior art safety device when the latter comes into repeated impinging contact against the former, with the result that the present safety device as a whole can maintain orderly and proper function for more prolonged period of time than the prior art safety device.

Still further advantageously, since the switch 66,104 can be installed in various positions surrounding the plate cam 32,100, the safe device as a whole is so flexible in shape as to be installed in a remaining small space of any contour defined by a crowd of components mounted on the forceful reciprocation machine.

From the foregoing description of a limited number of embodiments, the artisan will appreciate that the invention is generally applicable to a machine having a work performing member movable over a given reciprocation path between a work station and a point remote therefrom; and in which machine there is drive means, which when activated, drives the work performing member over said reciprocation path, and there is provided switch means associated with the drive means to control the activation thereof. Generally, the switch means 66 has a first switching state whereby the drive means is maintained in a non-activation state to prevent movement of the work performing member toward the work station. The switch means also has a second switching state whereby the drive means is set into an activation state to effect movement of the work performing member toward the work station.

Basically, the invention provides an improvement which comprises a cam support for pivotal movement relative to a follower member 68, 70 of the switch means, the cam 32 having a cam surface disposed for engagement by the follower member 70 to thereby operate the switch means in accordance with the angular position of the cam. The follower member and contour of the cam surface co-operate to operate the switch means into the second switching state at a given angular position of the cam, namely that which corresponds to rigistry of the concave portion 35 with the follower 70 in the FIG. 2 embodiment, or registry of the convex portion 102 with the follower of switching means 104 as in the FIG. 4 embodiment. At other angular positions of the cam, the follower member and cam surface co-operate to operate the switch means into the first switching state.

Actuator means, such as that including the chain 72, is connected to the cam to pivotally move same from a reference angular position (corresponding to the first switching state of the switch means), to the given angular position to thereby activate the drive means, through the action of the switch means.

Sensor means, as including the arm 36 and extension 50 and loop 52, are disposed to sense an obstacle (not shown) between the work station 24, 82 and the point remote therefrom, the sensor means being coupled to the cam to restrict the angular movement thereof upon the sensing of such obstacle to prevent the movement of the cam by the actuator means into said given angular position. Consequently, upon the sensing of such obstacle, movement of the work performing member toward the work station is prevented.

The invention further broadly provides resilient means 62 coupled to the actuator means 72 and responsive to the movement of the cam 32 to impart a resistance force to the actuator means 72 as the cam approaches said given angular position to aid an operator in detecting impending movement of the work performing member toward the work station.

Although preferred embodiments have been shown and described in detail, it should be understood that various changes and modifications can be made therein without departing from the scope of the appended claims.

What is claimed is:

1. A safety device for a forceful reciprocation machine having a frame, a stationary block fixed to the frame and a reciprocating member mounted on the frame, disposed above and in vertically opposed relation to the stationary block, and adapted for vertical reciprocation thereto, said safety device comprising, in combination:

(a) a sensor pivotally mounted at its one end on the frame and having the other end thereof disposed between the stationary block and said reciprocating member for detecting an obstacle on the stationary block;

(b) a plate cam pivotally mounted coaxially with said sensor and having a deflection formed on the peripheral surface thereof;

(c) first means for confining with the stationary block the angular movement of said sensor to a first angular range;

(d) second means for confining the relative angular movement of said sensor and said plate cam to a second angular range;

(e) a first spring for urging said sensor in a first pivotal direction relative to said plate cam;

(f) a second spring for urging said plate cam in a second pivotal direction;

(g) a switch provided beside said plate cam and having a roller adapted for resilient and rolling engagement with the peripheral surface of said plate cam;

(h) activating means for turning said plate cam in the first pivotal direction against the bias of said first and second springs; so that said cam plate and said sensor are turned coextensively over said first angular range against the bias of said second spring until said sensor reaches the stationary block and thereafter said plate cam alone continues to be turned over said second angular range against the combined biases of said first spring and said second spring, whereupon said deflection is brought into engagement with said roller thereby activating the reciprocating member.

2. A safety device as defined in claim 1, wherein said sensor comprises a sensor arm pivotally mounted at its one end on the frame and a sensor rod attached to the other end of said sensor arm, said sensor rod terminating in a loop disposed in surrounding relation to the path along which the reciprocating member reciprocates.

3. A safety device as defined in claim 1, wherein said plate cam is of a tear-drop shaped configuration having an apex generally oriented towards the reciprocating member.

4. A safety device as defined in claim 2, said first confining means comprises a bracket having one leg fastened to the frame and the other leg provided with a threaded through hole and an adjustable screw screwed through said through hole and disposed in registry with said sensor arm for abutting engagement therewith.

5. A safety device as defined in claim 1, wherein said second confining means comprises a stud provided on one side surface of said plate cam and a peg provided on the side surface of said plate cam and spaced from said stud by the distance corresponding to said second angular range.

6. A safety device as defined in claim 2, wherein said first spring comprises a tension spring connected between a pin provided on the lower side of said sensor arm and a lug provided on one side surface of said plate cam and disposed below said second confining means.

7. A safety device as defined in claim 5, wherein said second spring comprises a tension spring connected between said stud and a post fixed to the frame upwardly of said plate cam.

8. A safety device as defined in claim 5, wherein said sensor rod has an indentation formed in the upper edge thereof and disposed in registry with said stud for receiving it therein when said plate cam is turned over said first and second angular ranges.

9. A safety device as defined in claim 1, wherein said deflection comprises a concave formed in the peripheral surface of said plate cam.

10. A safety device as defined in claim 1, wherein said deflection comprises a convex formed on the peripheral surface of said plate cam.

11. A safety device as defined in claim 5, wherein said activating means comprises a chain having its one end connected to said stud and a foot pedal rotatably mounted on the frame and having its one end connected to the other end of said chain.

12. In a machine for applying a fastener to a fabric, having a stationary table for supporting the fabric, a reciprocating member movable toward and away from the table for applying a fastener to a fabric supported on the table, a safety device for guarding the zone of the application of the fastener, and switching means for operating the machine, the improvement wherein (a) the safety device is pivotably mounted for movement in a first pivotal direction within a first angular distance between a retracted position withdrawn from the work-supporting table and an extended position in juxtaposition with the work-supporting table; and (b) the switching means comprises:

(I) a machine operating switch;

(II) a cam pivotably mounted coaxially with the safety guard for movement in said first pivotal direction within a second angular distance between a first position and a second position for actuating said operating switch, said second angular distance being greater than said first angular distance, (III) first spring means acting between the safety guard and said cam for normally urging them in co-rotating relation to one another, (IV) second spring means for urging said cam in a second pivotal direction opposite to said first pivotal direction toward said first position thereof; and (V) means for actuating said cam to rotate in said first pivotal direction, said cam being co-rotatable with the safety guard within said first angular distance until the safety guard reaches at said extended position thereof, and further movable in said first pivotal direction independent of the safety guard against the bias of said first and second spring means to said second position thereof.

* * * * *